(12) United States Patent
Bircher et al.

(10) Patent No.: US 9,317,096 B2
(45) Date of Patent: Apr. 19, 2016

(54) PERFORMANCE AWARE IDLE POWER MANAGEMENT

(71) Applicant: ADVANCED MICRO DEVICES, INC., Sunnyvale, CA (US)

(72) Inventors: William L. Bircher, Austin, TX (US); Madhu Saravana Sibi Govindan, Austin, TX (US); Brian E. Waldecker, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 430 days.

(21) Appl. No.: 13/717,992

(22) Filed: Dec. 18, 2012

(65) Prior Publication Data

US 2014/0173298 A1 Jun. 19, 2014

(51) Int. Cl.
*G06F 1/26* (2006.01)
*G06F 1/32* (2006.01)
(52) U.S. Cl.
CPC ................................ *G06F 1/3203* (2013.01)
(58) Field of Classification Search
CPC ........................................................ G06F 1/32
See application file for complete search history.

(56) References Cited

U.S. PATENT DOCUMENTS

| 6,738,068 | B2 | 5/2004 | Cohen et al. | |
|---|---|---|---|---|
| 6,983,384 | B2 | 1/2006 | Iwaki | |
| 2008/0168290 | A1* | 7/2008 | Jobs et al. | 713/324 |
| 2009/0066529 | A1* | 3/2009 | Fukada | 340/657 |
| 2009/0235260 | A1* | 9/2009 | Branover et al. | 718/102 |
| 2011/0060924 | A1 | 3/2011 | Khodorkovsky | |
| 2011/0208986 | A1* | 8/2011 | Soga | 713/323 |
| 2011/0246800 | A1 | 10/2011 | Accpadi et al. | |
| 2012/0046912 | A1* | 2/2012 | Indukuru et al. | 702/186 |
| 2012/0131365 | A1* | 5/2012 | Tabone et al. | 713/320 |
| 2012/0249559 | A1 | 10/2012 | Khodorkovsky et al. | |
| 2014/0032947 | A1* | 1/2014 | Ahmad et al. | 713/320 |

* cited by examiner

*Primary Examiner* — Thomas Lee
*Assistant Examiner* — Chad Erdman
(74) *Attorney, Agent, or Firm* — Park, Vaughan, Fleming & Dowler LLP

(57) ABSTRACT

Methods, systems, and media are provided for power management. The power management includes, but is not limited to storing at a computer system a history of canceled entries into a low power state that interrupted a transition of the unit from an active mode to the low power state and disallowing transition of the unit into the low power state when a number of canceled entries indicated by the history of canceled entries exceeds a canceled entry threshold.

20 Claims, 2 Drawing Sheets

PERFORMANCE AWARE IDLE POWER MANAGEMENT

TECHNICAL FIELD

The technical field relates generally relates to power management in computer systems, and more particularly relates to idle power management that adjusts based on a history of canceled low power state entries.

BACKGROUND

Typical computing systems include power consuming components such as graphics processing units (GPUs) and central processing units (CPUs). Improvements in power consumption may be achieved by causing one or more of the power consuming components to enter a low power state when the power consuming components are idle for a certain amount of time.

Transition phases that are performed after the low power state is requested but before power has been reduced to the power consuming component typically include such processes as offloading a state of the component to memory so that the state of the component may be restored when the component exits the low power state. The computing system typically experiences a performance reduction when use of the power consuming component is desired during a transition phase. To avoid interrupting the transition, typical power reduction techniques typically include an idle delay that is longer than is desired for optimal power consumption reduction.

SUMMARY OF EMBODIMENTS

Methods, systems, and computer readable medium are provided for power management. In some embodiments a method includes storing at a computer system a history of canceled entries into a low power state that interrupted a transition of the unit from an active mode to the low power state and disallowing transition of the unit into the low power state when a number of canceled entries indicated by the history of canceled entries exceeds a canceled entry threshold.

In some embodiments a non-transitory computer readable medium stores control logic for power management of a unit of a computer system. The control logic includes control logic instructions to store in the computer system a history of canceled entries into a low power state that interrupted a transition of the unit from an active mode to the low power state, increment a number of canceled entries that is indicated by the history of canceled entries when transition of the unit is interrupted, decrease the number of canceled entries when the unit achieves the low power state, and disallow transition of the unit into the low power state when the number of canceled entries exceeds a canceled entry threshold.

In some embodiments a computing system includes a power consuming unit and power management control logic for power management of the power consuming unit. The power consuming unit includes an active mode and a low power state. The power management control logic includes control logic instructions to store a history of canceled entries into the low power state that interrupted a transition of the power consuming unit from the active mode to the low power state, increment a number of canceled entries that is indicated by the history of canceled entries when the transition of the power consuming unit is interrupted, decrease the number of canceled entries when the power consuming unit achieves the low power state, and disallow transition of the power consuming unit into the low power state when the number of canceled entries exceeds a canceled entry threshold.

BRIEF DESCRIPTION OF THE DRAWINGS

Advantages of the embodiments disclosed herein will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiments described herein as "exemplary" are not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, and the following detailed description or for any particular computing system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computing systems and other functional aspects of a computing system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in the embodiments disclosed herein.

In general, methods, systems, and media are provided for improving power management in idle devices and units in a performance aware manner. A history of interruptions during transition to a low power state may be utilized to deny transition and entry into the low power state under some conditions, as will be described below. Such denial may avoid performance penalties associated with interrupting the transition when resuming an active mode of the unit.

Figure 1:
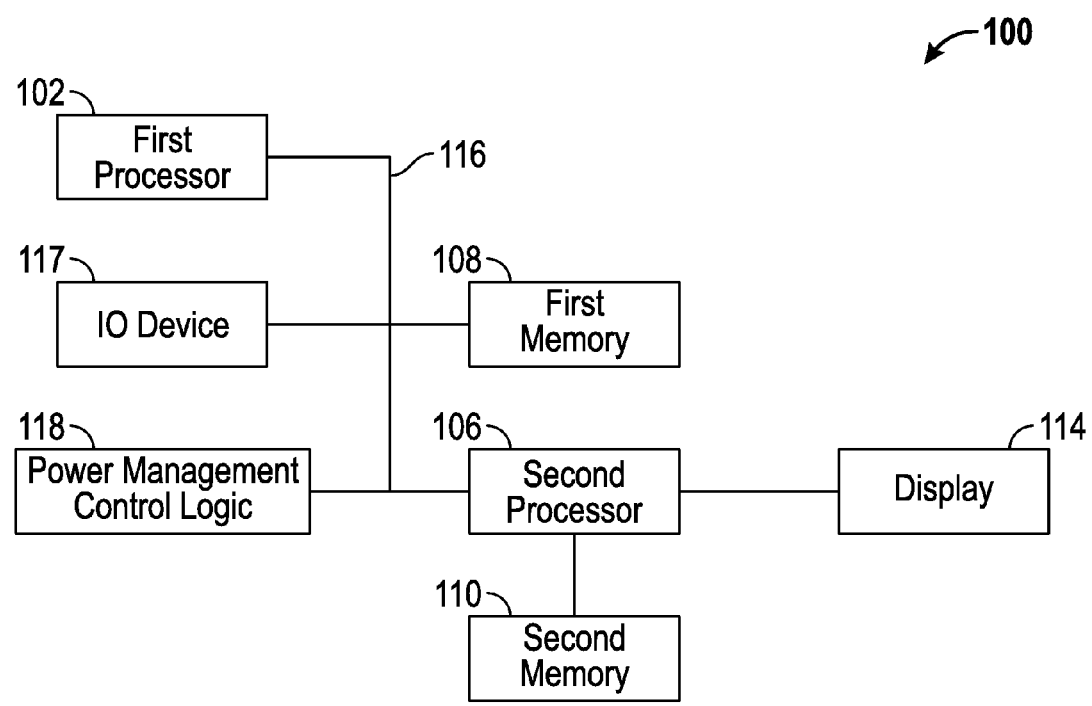
FIG. 1 is a simplified block diagram of a computing system according to some embodiments.

FIG. 1 is a simplified block diagram illustrating a computing system 100. Computing system 100 includes a first processor 102, a second processor 106, a first memory 108, a second memory 110 associated with the second processor 106, a display 114, an input/output (IO) device 116, and power management control logic 118. The components of the computing system 100 are electronically coupled with an interconnect 117 for communication. In some embodiments the system 100 includes one or more software, hardware, and firmware components in addition to or different from those shown in FIG. 1.

In the example provided, the first processor 102 is a central processing unit (CPU) and the second processor 106 is a graphics processing unit (GPU). It should be appreciated that the first processor 102 may include any number of processing cores. The second processor 106 completes graphics tasks and other tasks suited for single instruction multiple data (SIMD) processing. For example, the second processor 106 may complete rendering, display, or other tasks assigned by the first processor 102.

In the example provided, the first memory 108 is a system memory that includes a dynamic memory which holds instructions and/or data that are the input or output of processes or applications executing on the first processor 102 or the second processor 106.

The second memory 110 stores information relevant to the associated second processor 106. For example, the second memory 110 may store surfaces rendered by the second processor 106, graphics to be displayed on display 114, etc. The Display 114 may be a variety of different devices that display graphics information, such as a computer screen.

The IO device 116 may be any device that transfers data with respect to the first memory 108 using a direct memory access (DMA) convention. In the example provided, the input output (IO) device 116 is connected through a peripheral component interconnect (PCI). For example, the IO device 116 may be a network card, sound card, disc controller, video card, television tuner card, or other device.

The power management control logic 118 may be implemented as hardware, firmware, software, or any combination thereof. For example, the power management control logic may be implemented in hardware and integrated with the first processor 102. In some embodiments, the power management control logic may be a software program that is stored on a non-transitory computer readable medium. The power management control logic 118 controls the power state of the computing system 100 and/or the individual components of the computing system 100. The components of the computing system 100 may be put into a low power state at different time intervals. For example, the first processor 102 may be put into a low power state after the first processor 102 has been idle for a first amount of time and the display 114 may be put into a low power state after the display 114 has been idle for a second amount of time that is longer than the first amount of time.

Figure 2:
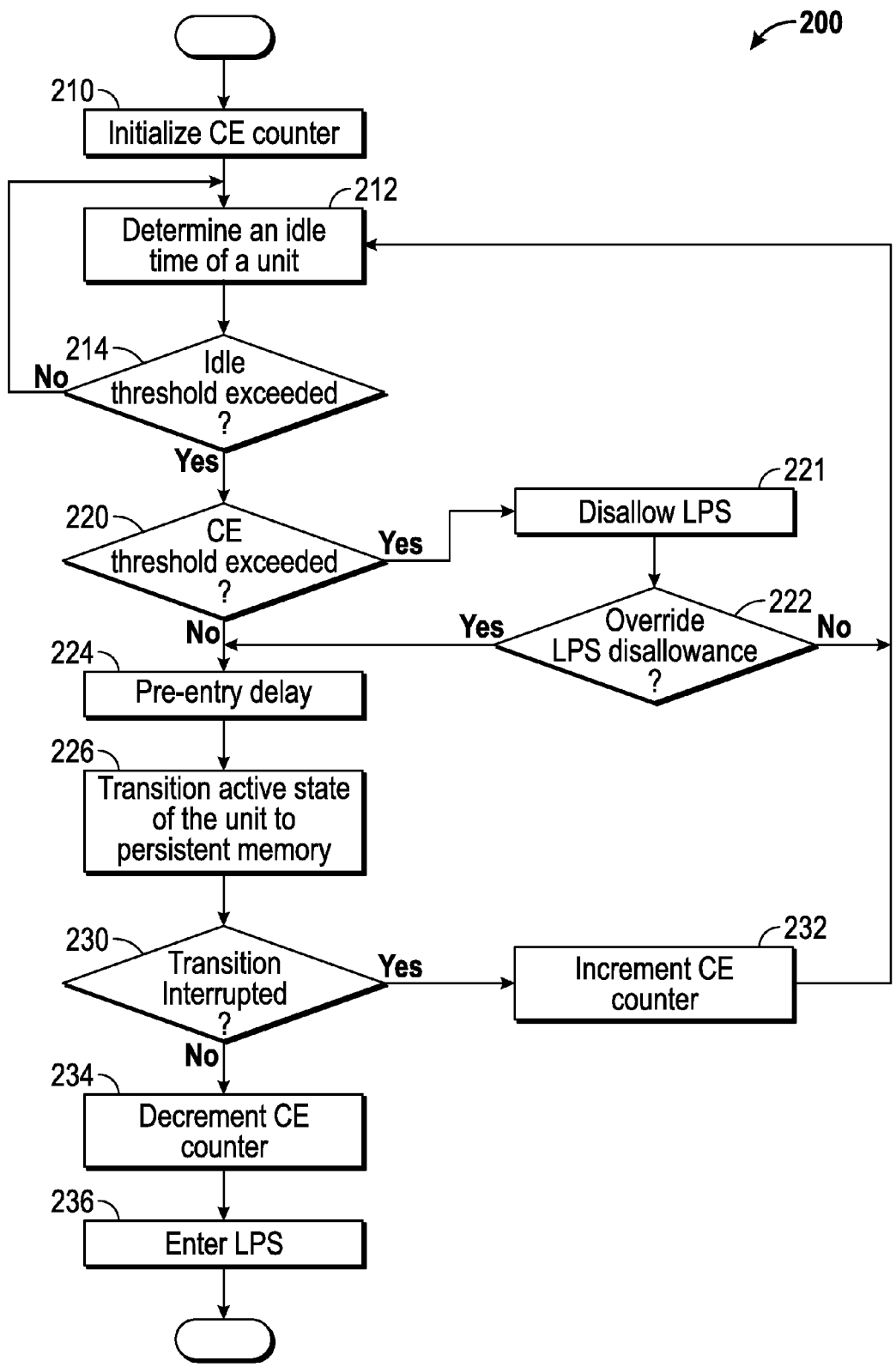
FIG. 2 is a flow diagram illustrating a method of idle power management according to some embodiments.

Referring now to FIG. 2, a flow diagram of a method 200 for power management of a unit of a computer system is illustrated. For example, the method 200 may be performed by the power management control logic 118 and may be applied to the first processor 102 of the computer system 100. It should be appreciated that the method 200 may be applied to other types of units, such as processor cores, memory, disks, IO components, whole computer systems, portions of integrated subsystems, and the like. In general, the method 200 monitors the past history of low power entry and exit combined with a tunable heuristic to allow or disallow entry into a low power state of the unit. In some embodiments, entry into the low power state is restricted when the unit has exhibited a history of failing to successfully enter the low power state after becoming eligible, such as when entry into the low power state is canceled during a transition phase.

At step 210 a canceled entries (CE) counter is initialized to track a number of times that entry into a low power state of the unit has been interrupted or canceled during a transition phase. In the example provided, an N-bit saturating counter is implemented that saturates at values of 0 and N. The selection of a value for N may be based on a desired optimization of power use and performance of the system 100.

At step 212 an idle time of the unit is determined. The idle time indicates the amount of time that has passed since the unit was last utilized by the system 100. For example, an idle time of the first processor 102 may be indicated by a countdown timer that starts when the first processor 102 becomes idle.

The method 200 determines whether the idle time is greater than an idle threshold at step 214. The idle threshold time may vary with the type of unit. For example, the first processor 102 may have a threshold of several hundred microseconds. When the idle time is not greater than the threshold, then the method returns to step 212.

When the idle time is greater than the threshold, then the method determines whether a canceled entries (CE) threshold has been exceeded at step 220. In the example provided, the threshold value is between 0 and N−1. It should be appreciated that the value of the threshold may vary based on a desired power and performance of the system 100. When the canceled entries threshold is exceeded then entry into the low power state is disallowed at step 221. Restricting entry into the low power state may be desired where, for example, performance is reduced due to recurring interruptions of entry into the low power state.

The method determines in step 222 whether to override the disallowance of entry into the low power state. The determination permits the unit to resume entry into the low power state after one or more entries into the low power state have been disallowed. In the example provided, entry into the low power state is disallowed until a failure monitor detects that entry conditions have been satisfied. For example, the failure monitor may decrement the canceled entries counter when the unit is consistently not becoming active at times that would have interrupted transition to the low power state. In some embodiments, an additional countdown timer may be incorporated to wait for a period of time that is equal to or greater than an amount of time that a transition typically takes. With an additional countdown timer, disallowance may be overridden when the additional countdown timer expires and the unit is still idle.

Entry into the low power state is delayed by a pre-entry delay at step 224. At step 226 the state of the unit is transitioned to a persistent memory. Storing the state of the unit in a persistent memory permits the active state of the processor to be restored when the unit exits the low power state. In the example provided, the transition is conducted over a first transition phase and a second transition phase that have different performance penalties associated with interrupting the transition when resuming operating the unit in the active mode.

The method 200 at step 230 determines whether the transition was interrupted. The transition may be interrupted by any event that requires the unit to resume the active mode during the transition. For example, during direct memory access (DMA) operations, the first processor 102 may execute service routines in response to hardware interrupts generated by end of DMA events. The hardware interrupts may arrive at consistent intervals that correspond to a size of the DMA transfer. In some workloads the consistent intervals may be about equal to a combined amount of time of the idle threshold and entry delay. In workloads where the first processor has no other work to perform, the hardware interrupts may therefore repeatedly arrive during transition of the active state, which may reduce performance of the system 100.

Accordingly, when the transition is interrupted, the canceled entries counter is incremented in step 232. The counter increments each time entry into the low power state is interrupted during the transition into the low power state. Interruption during any portion of the transition that negatively impacts performance is counted as an interruption, as indicated in Table 1 below. In the example provided, the increment is proportional to the performance penalty from the interruption. For example, interruption during the transition phase 2 impacts performance more than an interruption during the transition phase 1. Accordingly, the counter may increment by one when the interruption occurs during transition phase 1, and may increment by two when the interruption occurs during transition phase 2. By incrementing the CE counter, the method 200 is able to determine when a history of interrupted transitions indicates that transitions are likely to be interrupted in the future. As used herein, "incrementing" the counter means that the counter indicates one additional canceled entry has occurred. The actual numerical value stored in the counter may increase, decrease, or vary by an amount that may be used to indicate that one additional canceled entry has occurred.

Table 1 indicates the performance penalty and whether resuming the active mode during various portions of the method counts as an interruption where the canceled entries counter is incremented.

TABLE 1

|  | Pre-Entry Delay | Transition Phase 1 | Transition Phase 2 | Low Power State |
|---|---|---|---|---|
| Performance Penalty | None | Low | High | None |
| Counted as Interruption? | No | Yes | Yes | No |

The canceled entries counter decrements at step 234 when low power state entry is successfully achieved in step 236. "Decrementing" as used herein means that the counter indicates that one additional successful entry into the low power state has occurred. Entry into the low power state may include entry into a sleep mode, hibernation mode, various states defined by the advanced configuration and power interface (ACPI) standard, or other power saving states. For example, the first processor 102 may be substantially or completely powered off by either selectively turning off power to its execution units and memory or by completely turning off the power to all portions of the first processor 102. In some embodiments, the low power state is entered by controlling the output of voltage regulators that are used to supply power signals to the unit.

The method illustrated in FIG. 2 may be governed by instructions that are stored in a non-transitory computer readable storage medium and that are executed by at least one processor of the computing system 100. Each of the operations shown in FIG. 2 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The provided methods, systems, and storage media have several beneficial attributes that promote increased performance and power use. For example, entry into low power states that harm performance may be restricted while power use benefits that these low power states provide may be allowed when no performance penalty is anticipated. Accordingly, a countdown interval or idle time threshold may be made shorter without causing excessive entries into the low power state in scenarios where history shows such entries to be mostly unsuccessful or undesirable. Additionally, the canceled entries threshold component permits tailoring how aggressively low power entry is denied based on design goals for power and performance.

While at least one exemplary embodiment has been presented in the foregoing detailed description of the disclosed embodiments, it should be appreciated that a vast number of variations exist. It should also be appreciated that the exemplary embodiment or exemplary embodiments are only examples, and are not intended to limit the scope, applicability, or configuration of the disclosed embodiments in any way. Rather, the foregoing detailed description will provide those skilled in the art with a convenient road map for implementing the disclosed embodiments, it being understood that various changes may be made in the function and arrangement of elements of the disclosed embodiments without departing from the scope of the disclosed embodiments as set forth in the appended claims and their legal equivalents.

What is claimed is:

1. A method for power management of a unit of a computer system, the method comprising:
storing, at the computer system, a history of canceled entries into a low power state that interrupted a transition of the unit from an active mode to the low power state; and
disallowing transition of the unit into the low power state when a number of canceled entries indicated by the history of canceled entries exceed a canceled entry threshold.

2. The method of claim 1 wherein storing the history of canceled entries includes storing the history of canceled entries in a saturating counter.

3. The method of claim 2 further including incrementing the saturating counter by an amount that is proportional to a performance penalty each time the transition into the low power state is interrupted.

4. The method of claim 2 further including decrementing the saturating counter each time the unit successfully enters the low power state.

5. The method of claim 2 wherein disallowing transition includes disallowing transition of the unit into the low power state when the saturating counter is at a maximum value of the saturating counter.

6. The method of claim 1 further including overriding disallowance of the transition of the unit when the unit has remained idle for the duration of a countdown timer, wherein the duration of the countdown timer is equal to or greater than an amount of time that the unit takes to transition from the active mode to the low power state.

7. The method of claim 1 further including operating the unit in the active mode when transition into the low power state has been disallowed.

8. The method of claim 1 further including indicating that the unit is eligible for transition into the low power state when the unit has been idle for more than a first amount of time, and wherein the first amount of time is less than a second amount of time that corresponds to an interval of hardware interrupts in a direct memory access transfer.

9. A non-transitory computer readable medium storing control logic for power management of a unit of a computer system, the control logic including control logic instructions to:
- store in the computer system a history of canceled entries into a low power state that interrupted a transition of the unit from an active mode to the low power state;
- increment a number of canceled entries that is indicated by the history of canceled entries when transition of the unit is interrupted;
- decrease the number of canceled entries when the unit achieves the low power state; and
- disallow transition of the unit into the low power state when the number of canceled entries exceeds a canceled entry threshold.

10. The non-transitory computer readable medium of claim 9 wherein the control logic further includes control logic instructions to store the number of canceled entries in a saturating counter.

11. The non-transitory computer readable medium of claim 10 wherein the control logic further includes control logic instructions to disallow transition of the unit into the low power state when the saturating counter is at a maximum value of the saturating counter.

12. The non-transitory computer readable medium of claim 9 wherein the control logic further includes control logic instructions to override disallowance of the transition of the unit when the unit has remained idle for the duration of a countdown timer, wherein the duration of the countdown timer is equal to or greater than an amount of time that the unit takes to transition from the active mode to the low power state.

13. The non-transitory computer readable medium of claim 9 wherein the control logic further includes control logic instructions to indicate that the unit is eligible for transition into the low power state when the unit has been idle for more than a first amount of time, and wherein the first amount of time is less than a second amount of time that corresponds to an interval of hardware interrupts in a direct memory access transfer.

14. A computing system comprising:
- a power consuming unit that includes an active mode and a low power state;
- power management control logic for power management of the power consuming unit, the power management control logic including control logic instructions to:
  - store a history of canceled entries into the low power state that interrupted a transition of the power consuming unit from the active mode to the low power state;
  - increment a number of canceled entries that is indicated by the history of canceled entries when the transition of the power consuming unit is interrupted;
  - decrease the number of canceled entries when the power consuming unit achieves the low power state; and
  - disallow transition of the power consuming unit into the low power state when the number of canceled entries exceeds a canceled entry threshold.

15. The computing system of claim 14 wherein the power management control logic further includes control logic instructions to store the number of canceled entries in a saturating counter.

16. The computing system of claim 15 wherein the power management control logic further includes control logic instructions to disallow transition of the power consuming unit into the low power state when the saturating counter is at a maximum value of the saturating counter.

17. The computing system of claim 14 wherein the power management control logic further includes control logic instructions to override disallowance of the transition of the power consuming unit when the power consuming unit has remained idle for the duration of a countdown timer, wherein the duration of the countdown timer is equal to or greater than an amount of time that the power consuming unit takes to transition from the active mode to the low power state.

18. The computing system of claim 14 wherein the power consuming unit is a processor.

19. The computing system of claim 18 further including an input/output device that generates interrupts at the processor, and wherein the interrupts at the processor interrupt transition of the processor from the active mode to the low power state.

20. The computing system of claim 14 wherein the power management control logic further includes control logic instructions to indicate that the unit is eligible for transition into the low power state when the unit has been idle for more than a first amount of time, and wherein the first amount of time is less than a second amount of time that corresponds to an interval of hardware interrupts in a direct memory access transfer.

* * * * *